Dec. 24, 1946. A. C. KELLE 2,413,106
PIPE COUPLING
Filed March 1, 1944
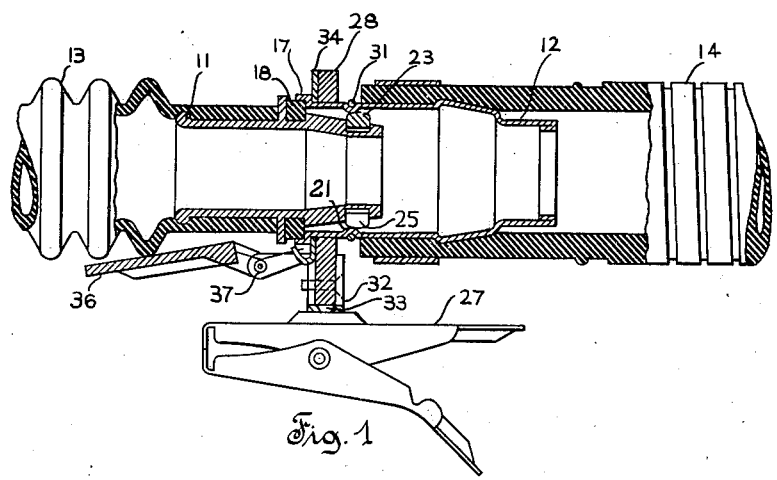
Fig. 1
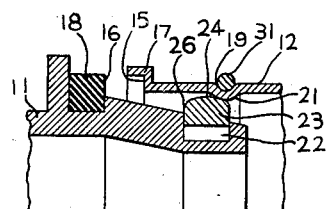
Fig. 2
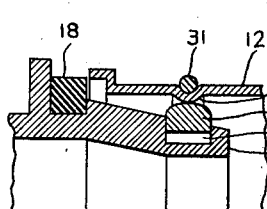
Fig. 3
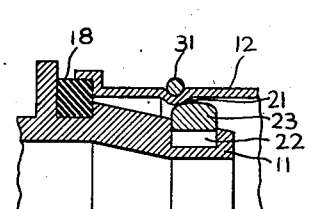
Fig. 4
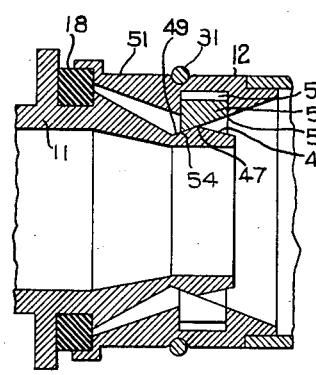
Fig. 7
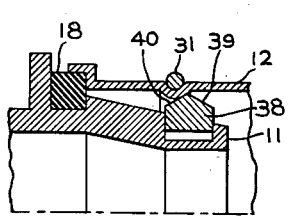
Fig. 5
Fig. 6
Inventor
Arthur C. Kelle
by Didier Journeaux
Attorney Patented Dec. 24, 1946

2,413,106

UNITED STATES PATENT OFFICE 2,413,106

PIPE COUPLING

Arthur C. Kelle, Stoughton, Mass., assignor to Allis-Chalmers Manufacturing Company, Milwaukee, Wis., a corporation of Delaware Application March 1, 1944, Serial No. 524,544

6 Claims. (Cl. 285—77)

This invention relates in general to improvements in pipe couplings and more particularly to a coupling for pipes or hose carrying fluid under relatively low pressure, the coupling to be readily detached by exerting a moderate tractive effort on the two coupling connectors.

Detachable pipe couplings are known in which the connectors are held in engagement by means of a plurality of resilient fingers or segments of one of the connectors engaging a shoulder of the other connector. Such fingers or segments, however, are easily damaged and are easily fouled by dust, sand or frost to the extent of rendering the coupling inoperative. It is therefore preferable to effect the resilient engagement of the coupling connectors through a single resilient split ring partially inserted in an annular groove provided in one of the connectors and forming therewith an assembly which is easily maintained in operative condition. The ring is given a suitable profile so as to enable it to slide over a shoulder provided in the other connector to exert thereon a thrust urging the connectors into further engagement while permitting separation of the coupling by exerting on the connectors a tractive effort overcoming such thrust.

It is therefore one of the objects of the present invention to provide an improved detachable pipe coupling in which the connectors are urged into engagement by the thrust exerted thereon by a resilient annular member.

Another object of the present invention is to provide an improved detachable pipe coupling in which the connectors are held in engagement by means of a single resilient member.

Another object of the present invention is to provide an improved detachable pipe coupling comprising connectors which may be separated by overcoming the thrust exerted thereon by a single resilient locking member.

Objects and advantages other than those above set forth will be readily apparent from a consideration of the following description when read in connection with the accompanying drawing, in which:

Fig. 1 is a view in axial cross-section through a pipe coupling comprising a male connector provided with a resilient locking ring in accordance with the present invention, the connectors being in coupled position.

Figs. 2, 3, and 4 show in enlarged axial cross-section the cooperating portions of the connectors of Fig. 1 in three relative positions obtaining sequentially during engagement of the coupling.

Fig. 5 is a view in axial cross-section through a modified embodiment of the present invention.

Fig. 6 is a view in axial cross-section through another modified embodiment of the present invention, and Fig. 7 is a view in axial cross-section through a further modified embodiment of the present invention comprising a female connector provided with a resilient locking ring.

Referring more particularly to the drawing by characters of reference, Figs. 1 to 4 show a pipe coupling comprising a male connector 11 cooperating with a female connector 12 for joining a flexible hose 13 with another flexible hose 14 in quickly detachable gas-tight relation. Hose 13 may be attached to an oxygen mask and hose 14 may be connected to a supply of oxygen under pressure not greatly exceeding the ambient atmospheric pressure. Connectors 11, 12 are of generally tubular shape and the relative engagement thereof is limited to the extent shown in Figs. 1 to 4 by abutment of complementary annular surfaces 15, 16 thereof. Surface 15 is defined by a flange 17 of connector 12 and surface 16 is preferably defined by a body of resilient fluid-tight material such as a rubber gasket 18 forming part of connector 11.

The portions of connectors 11, 12 adjacent the free ends thereof constitute complementary annular walls so disposed as to fit one within the other when the connectors are coupled. Connector 12 is preferably given the configuration shown by spinning, in the course of which operation a groove 19 is indented in the outer surface of connector 12. The formation of groove 19 also causes the formation on the inner surface of connector 12 of an annular shoulder 21 facing the free end portion of the wall of connector 11.

Shoulder 21 has an inside diameter which varies along the axial length thereof, the minimum inside diameter of the shoulder being its effective diameter for the purpose of locking connectors 11, 12 in coupled position. Shoulder 21 is shown as being of toroidal cross-section sloping from the portion thereof of minimum inside diameter toward the free end of connector 12 and also sloping toward the end of the connector fitted into hose 14. Such characteristics, however, need not be adhered to and the profile of the shoulder cross-section may be chosen arbitrarily.

The wall portion of connector 11 facing shoulder 21 is provided with an annular groove 22 defined by a cylindrical bottom surface and two flat annular side surfaces. Groove 22 contains a split ring 23 consisting of a single piece of any suitable resilient material such as ferrous or nonferrous metal, synthetic resin, ceramics, etc., depending on the magnitude of the tractive effort to be exerted on the coupling for separating the connectors. Ring 23 presents a cut 25 assumed to be located in the lower part of the ring about the plane of section in Fig. 1. It will be understood however that the cut may be made in any other known manner, and may provide for a substantially fluid-tight engagement of ring 23 with shoulder 21.

Ring 23 comprises a portion 24 of maximum outside diameter joined to at least one portion 26 of minimum outside diameter by intermediate portions of gradually decreasing outside diameter to form a working surface having a curved convex profile. The outside diameters of the different portions of ring 23 are the effective diameters thereof for the purpose of locking connectors 11, 12 in coupled position. Ring 23 is so dimensioned that the effective diameter of shoulder 21 is intermediate the effective diameters of ring portions 24 and 26 but the diameter of ring portion 24 is preferably less than the inside diameter of the portions of connector 12 adjacent shoulder 21.

The inside diameter of the ring is made substantially constant to permit using a ring of relatively large axial thickness and of relatively small radial thickness. In this manner the bore of the portion of connector 11 adjacent ring 23 may be given a maximum diameter and the obstruction offered to the flow of gas by connector 11 is reduced to a minimum. Ring 23 has a snug fit against the sides of groove 22 but a loose fit against the bottom of the groove to permit compression of the ring during engagement of the coupling and to prevent the ring interfering with the alignment of connectors 11, 12.

The coupling may be provided with a clip 27 for fastening the coupling to a garment. Clip 27 may be attached to connector 12 through a ring 28 secured on the connector between flange 17 and a snap ring 31 held in groove 19. A yoke 32 screwed to ring 28 bears a pin 33 riveted thereto which serves as a pivot for clip 27 mounted thereon. Ring 28 may be welded to another ring 34 provided with bent extensions on which a cover 36 is pivoted. Cover 36 is urged toward position closing the free end of connector 12 by means of a torsion spring 37.

When hose 13 and 14 are to be connected, cover 36 is held substantially in the position shown and the free end of connector 11 is introduced into the free end of connector 12. The connectors then reach the relative position shown in Fig. 2, in which position ring 23 engages one of the sloping portions of shoulder 21. Further engaging movement of the connectors causes the working surface of ring 23 to be forced on shoulder 21. The ring is thus gradually deformed and its diameter is reduced by sliding of its working surface on the shoulder whereby the ring exerts on the shoulder an axial thrust resisting engagement of the connectors.

When the connectors reach the relative position shown in Fig. 3 the maximum deformation of ring 23 is obtained and the ring does not exert any thrust on the shoulder. Further engagement of the connectors into substantially the position shown in Figs. 1 and 4 causes further sliding of the working surface of ring 23 on shoulder 21 whereby the ring gradually becomes less deformed and exerts an axial thrust on the shoulder 21 urging the connectors into further engagement.

The engagement of the connectors is limited to a predetermined extent by abutment of surface 15 of flange 17 against surface 16 of gasket 18. When the connectors are in such relative position shoulder 21 may engage any portion of ring 23 intermediate portions 24 and 26 thereof, and under this condition ring 23 continues to exert an axial thrust on shoulder 21 to hold the connectors in engagement. This thrust is taken by flange 17 and gasket 18 which are thereby applied against each other to maintain the connectors in fluid-tight relation, provided that the pressure within the connectors does not greatly exceed the ambient atmospheric pressure. The joint between flange 17 and gasket 18 remains tight regardless of any moderate inaccuracies in the dimensions of connectors 11, 12 as the loose fit of ring 23 against the bottom of groove 22 permits connector 11 to be misaligned with respect to shoulder 21 to a small extent determined by the fit of flange 17 against gasket 18.

The coupling may be disengaged by exerting on the connectors a tractive effort exceeding the thrust exerted by ring 23 on shoulder 21. The efforts required for engaging and disconnecting the coupling depend on the slopes of the different portions of ring 23 and of shoulder 21. These efforts are equal when the shoulder and the ring have symmetrical profiles, but both vary in dependence upon the relative position of the connectors when both the ring and the shoulder have coacting surfaces of convex profile as in the embodiment illustrated in Figs. 1 to 4. When the connectors are separated, cover 36 is held by spring 37 against the free end of connector 12 to prevent the ingress of dust or other foreign material into hose 14.

The embodiment illustrated in Fig. 5 utilizes a ring 38 having a working surface consisting of two frusto-conical portions 39, 40. The axial slope of surface 39 is relatively flat so that during engagement of surface 39 with shoulder 21 ring 38 exerts on the shoulder an axial thrust which is relatively low and which varies relatively little with the relative displacement of the connectors. The coupling may thus be engaged with relatively little effort. The axial slope of surface 40 is relatively steep so that when surface 40 engages shoulder 21 ring 38 exerts on the shoulder an axial thrust which is relatively high but which also varies relatively little with the relative displacement of the connectors. The coupling therefore requires a relatively large tractive effort to initiate the disengagement of the connectors but the variation of this effort with the relative position of the connectors is reduced to a minimum. It will be understood that surfaces 39, 40 may also be given equal slopes when it is desired that equal efforts be required to couple and uncouple the connectors.

In the embodiment illustrated in Fig. 6 connector 11 cooperates with a female connector consisting partly of a bushing 42 which is machined to form a shoulder 43 on the bore thereof. The shoulder is defined by a frusto-conical surface 44 having a relatively flat axial slope toward the free end of the connector, and a transverse plane surface 45. In this manner the effort required for engaging the coupling is relatively low and depends only on the slope of surface 44 as long as ring 23 slides thereon. The effort required to disengage the coupling is relatively large and depends only on the slope of the portion of the working surface of ring 23 in contact with the crest of shoulder 43. It will be apparent that shoulder 43 may also cooperate with a ring other than ring 23, such as ring 38 shown in Fig. 5, for example.

In the embodiment illustrated in Fig. 7 the outside surface of the male connector barrel is provided with a shoulder 47 defined by two frustoconical surfaces 48, 49. Shoulder 47 has its maximum outside diameter, which is its effective diameter, at the juncture of surfaces 48 and 49. The female connector comprises a bushing 51 having its bore provided with a groove 52 for receiving a resilient split ring 53. The ring comprises a portion of minimum effective inside diameter 54 connected to a portion of maximum effective inside diameter 55 through portions of gradually varying diameter defining a frustoconical surface preferably having the same axial slope as surface 49.

In the present embodiment engagement of the connectors first causes ring portion 54 to slide on surface 48 whereby ring 53 is gradually deformed. The ring diameter increases, whereby the ring exerts a relatively low axial thrust on shoulder 47 resisting the engagement of the connectors. Further engagement of the connectors causes ring portion 54 to engage surface 49. The ring then becomes gradually less deformed to exert a relatively high axial thrust on the shoulder urging the connectors into further engagement limited by abutment of the cooperating surfaces of bushing 51 and gasket 18. It will be apparent that shoulder 47 may also cooperate with rings other than ring 53 bounded by inside working surfaces having convex profiles similar to the profiles of the outside working surfaces of ring 23 of the embodiment illustrated in Figs. 1 to 4 or of ring 38 of the embodiment illustrated in Fig. 5.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. A pipe coupling comprising a female member, a male member for axial engagement with said female member, said members having complementary surfaces so disposed as to abut to limit the engagement of said members to a predetermined extent, said members having complementary annular walls so disposed as to fit one within the other, one of said walls defining an annular shoulder so disposed as to face the other one of said walls, said other one of said walls defining an annular groove so disposed as to face said shoulder, and means responsive to engagement of said members to substantially said predetermined extent for urging said members into further engagement comprising a resilient split ring disposed in said groove and having a snug fit against the sides of said groove and a loose fit against the bottom of said groove, said shoulder and said ring having coacting surfaces so formed that engaging movement of said members first causes said ring to be gradually deformed by sliding of said ring over said shoulder until maximum deformation of said ring is obtained and thereafter causes further sliding of said ring over said shoulder to cause said ring gradually to become less deformed and thereby exert an axial thrust on said shoulder in the direction of engagement of said members.

2. A pipe coupling comprising a female member, a male member for axial engagement with said female member, said members having complementary surfaces so disposed as to abut to limit the engagement of said members to a predetermined extent, at least one of said complementary surfaces being defined by a body of resilient fluid tight material so disposed as to engage the other one of said complementary surfaces in fluid-tight relation thereto, said members having complementary annular walls so disposed as to fit one within the other, one of said walls defining an annular shoulder so disposed as to face the other one of said walls, said other one of said walls defining an annular groove so disposed as to face said shoulder, and means responsive to engagement of said members to substantially said predetermined extent for urging said members into further engagement comprising a resilient split ring disposed in said groove and having a snug fit against the sides of said groove and a loose fit against the bottom of said groove, said shoulder and said ring having coacting surfaces so formed that engaging movement of said members first causes said ring to be gradually deformed by sliding of said ring over said shoulder until maximum deformation of said ring is obtained and thereafter causes further sliding of said ring over said shoulder to cause said ring gradually to become less deformed and thereby exert an axial thrust on said shoulder in the direction of engagement of said members and maintain said members in fluid-tight relation under internal pressures insufficient to overcome said thrust.

3. A pipe coupling comprising a female member, a male member for axial engagement with said female member, said members having complementary surfaces so disposed as to abut to limit the engagement of said members to a predetermined extent, said female member being provided with a bore forming an annular shoulder of predetermined minimum diameter sloping toward the free end of said female member, the outer surface of said male member being of such configuration as to fit within said bore and being provided with an annular groove, and means responsive to engagement of said members to substantially said predetermined extent for urging said members into further engagement comprising a resilient split ring partially inserted in said groove and having a snug fit against the sides of said groove and a loose fit against the bottom of said groove, said ring comprising a portion of maximum outside diameter joined to a portion of minimum outside diameter by portions of gradually decreasing outside diameter, said minimum inside diameter of said shoulder being intermediate said minimum and maximum outside diameters of said ring whereby engaging movement of said members first causes said ring to be gradually compressed by sliding over the sloping portion of said shoulder until passage of said ring portion of maximum outside diameter over said shoulder and thereafter causes portions of said ring of decreasing outside diameter to slide over said shoulder and causes said ring gradually to expand to exert a thrust on said shoulder in the direction of engagement of said members.

4. A pipe coupling comprising a female member, a male member for axial engagement with said female member, said members having complementary surfaces so disposed as to abut to limit the engagement of said members to a predetermined extent, said male member comprising a barrel provided with an annular shoulder of predetermined maximum outside diameter sloping toward the free end of said male member, the bore of said female member being of such configuration as to fit around said barrel and being provided with an annular groove, and means responsive to engagement of said members to substantially said predetermined extent for urging said members into further engagement comprising a resilient split ring disposed in said groove and having a snug fit against the sides of said groove and a loose fit against the bottom of said groove, said ring comprising a portion of minimum inside diameter joined to a portion of maximum inside diameter by portions of gradually increasing inside diameter, said maximum outside diameter of said shoulder being intermediate said minimum and maximum inside diameters of said ring whereby engaging movement of said members first causes said ring to be gradually expanded by sliding over the sloping portion of said shoulder until passage of said ring portion of minimum inside diameter over said shoulder, and thereafter causes portions of said ring of increasing inside diameter to slide over said shoulder to cause said ring gradually to contract to exert a thrust on said shoulder in the direction of engagement of said members.

5. A pipe coupling comprising male and female tubular coupling members disposed to fit one within the other and being relatively movable axially into and out of effective coupled and fluid sealed relation with respect to one another solely through application thereto of predetermined limited force manually applied directly to one of said members, the tubular wall of one of said coupling members being provided with a shoulder disposed to face the tubular wall of said other coupling member, the adjacent surface of said latter coupling member being provided with an annular groove, a resilient and radially deformable ring disposed in loose radially guided relation within said groove, said shoulder and said ring having opposed surfaces cooperatively engageable one with the other and including oppositely sloping surface portions, and means comprising complementary abutment sealing surfaces on said coupling members engageable in sealing relation one with the other to determine the limiting relative positions of and to seal the space between said coupling members when the latter are in effectively coupled condition, said shoulder and said ring being forcibly engageable one with the other along said cooperative surface portions thereof on forcible axial relative movement of said coupling members toward coupled condition to thereby cause said ring to be radially deformed and retracted within said groove to an extent to permit continued relative axial movement of said coupling members to a position wherein said ring is partly released from full deformed condition and said shoulder and said ring cooperate to releasably hold said coupling members in effectively coupled relation, with said complementary abutment surfaces in forcible and fluid sealing engagement.

6. A pipe coupling comprising male and female tubular coupling members disposed to fit one within the other and being relatively movable axially into and out of effective coupled relation with respect to one another solely through application thereto of predetermined limited force manually applied directly to one of said members, the tubular wall of one of said coupling members being provided with a shoulder disposed to face the tubular wall of said other coupling member, the adjacent surface of said latter coupling member being provided with an annular groove, a resilient and radially deformable ring disposed in loose radially guided relation within said groove, said shoulder and said ring having opposed surfaces cooperatively engageable one with the other and including oppositely sloping surface portions, and means comprising complementary abutment surfaces on said coupling members engageable one with the other to determine the limiting relative positions of said coupling members when the latter are in effectively coupled condition, said shoulder and said ring being forcibly engageable one with the other along said cooperative surface portions thereof on forcible axial relative movement of said coupling members toward coupled condition to thereby cause said ring to be radially deformed and retracted within said groove to an extent to permit continued relative axial movement of said coupling members to a position wherein said ring is partly released from full deformed condition and said shoulder and said ring cooperate to releasably hold said coupling members in effectively coupled relation, with said complementary abutment surfaces in forcible engagement.

ARTHUR C. KELLE.